(12) United States Patent
Frederick et al.

(10) Patent No.: US 10,577,032 B2
(45) Date of Patent: Mar. 3, 2020

(54) ACTIVE SEAL FOR DYNAMIC VEHICLE INTERFACE

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 31 days.

(21) Appl. No.: 15/602,177

(22) Filed: May 23, 2017

(65) Prior Publication Data

US 2018/0339733 A1    Nov. 29, 2018

(51) Int. Cl.
*B62D 35/00* (2006.01)
*B60R 16/023* (2006.01)

(52) U.S. Cl.
CPC .......... *B62D 35/00* (2013.01); *B60R 16/0231* (2013.01)

(58) Field of Classification Search
CPC ........................... B62D 35/00; B60R 16/0231
USPC ............................ 277/500, 650, 628; 701/70
See application file for complete search history.

(56) References Cited

U.S. PATENT DOCUMENTS

| | | |
|---|---|---|
| 2,992,038 A | 7/1961 | Manganello |
| 3,823,950 A | 7/1974 | Pedersen |
| 4,441,751 A | 4/1984 | Wesley |
| 4,472,469 A | 9/1984 | Thies |
| 4,475,766 A | 10/1984 | McKee |
| 4,688,841 A | 8/1987 | Moore |
| 4,982,889 A | 1/1991 | Eardley |
| 5,018,779 A | 5/1991 | Lund |
| 5,340,184 A | 8/1994 | Conrado |
| 5,516,185 A | 5/1996 | O'Donnell et al. |
| 5,603,510 A | 2/1997 | Sanders |
| 5,755,483 A | 5/1998 | Lund |
| 6,079,769 A | 6/2000 | Fannin et al. |
| 6,502,823 B1 | 1/2003 | Turnquist et al. |
| 6,617,015 B2 | 9/2003 | Rood |
| 6,846,035 B2 | 1/2005 | Wong et al. |
| 6,849,310 B2 | 2/2005 | Willett |

(Continued)

FOREIGN PATENT DOCUMENTS

WO    2010113967 A1    10/2010

*Primary Examiner* — Nga X Nguyen
(74) *Attorney, Agent, or Firm* — Christopher G. Darrow; Darrow Mustafa PC (57) ABSTRACT

A dynamic gap at a vehicle interface can be actively managed using an interface seal. The interface can be defined between a first vehicle component and a second vehicle component. A gap can be defined between the first vehicle component and the second vehicle component. The gap can have an associated width. The width of the gap can vary during vehicle operation. An interface seal can be provided at least partially within the first vehicle component. The interface seal can be movable between a stowed position and a deployed position. In the stowed position, the interface seal can be located substantially entirely within the first vehicle component. In the deployed position, the interface seal can extend at least partially out of the first vehicle component in a direction toward the second vehicle component. As a result, the width of the gap can be reduced.

16 Claims, 6 Drawing Sheets

(56) References Cited

U.S. PATENT DOCUMENTS

| | | |
|---|---|---|
| 7,066,470 B2 | 6/2006 | Turnquist et al. |
| 7,093,835 B2 | 8/2006 | Addis |
| 7,380,868 B2 | 6/2008 | Breidenbach |
| 7,900,982 B2 | 3/2011 | Moore |
| 8,123,281 B2 * | 2/2012 | Perkins ................ B62D 35/001 296/180.1 |
| 8,573,682 B2 | 11/2013 | Oomen |
| 8,801,076 B2 | 8/2014 | White, Sr. |
| 8,915,538 B2 | 12/2014 | Bland et al. |
| 9,097,130 B2 | 8/2015 | Willis et al. |
| 9,243,510 B2 | 1/2016 | Casavant et al. |
| 9,545,961 B2 | 1/2017 | Breidenbach |
| 9,637,181 B1 | 5/2017 | Cunningham |
| 9,688,136 B2 | 6/2017 | Roth et al. |
| 9,731,776 B1 | 8/2017 | Shen et al. |
| 2004/0041348 A1 | 3/2004 | Addis |
| 2004/0100035 A1 | 5/2004 | Turnquist et al. |
| 2009/0102227 A1 | 4/2009 | Herndon |
| 2010/0181785 A1 | 7/2010 | Moore |
| 2011/0198778 A1 | 8/2011 | Bellmore et al. |
| 2012/0193156 A1 | 8/2012 | Hirano |
| 2014/0019010 A1 * | 1/2014 | Smith .................. B62D 35/001 701/49 |
| 2014/0069103 A1 | 3/2014 | Willis et al. |
| 2014/0072418 A1 | 3/2014 | Casavant et al. |
| 2015/0123310 A1 | 5/2015 | Leonard |
| 2015/0274010 A1 | 10/2015 | Roth et al. |
| 2018/0022297 A1 | 1/2018 | Kulkarni et al. |
| 2018/0339734 A1 | 11/2018 | Williams et al. |

* cited by examiner

ACTIVE SEAL FOR DYNAMIC VEHICLE INTERFACE

FIELD

The subject matter described herein relates in general to seals and, more particularly, to seals for gaps at the interface between vehicle components.

BACKGROUND

Some vehicles, such as some trucks and utility vehicles, are built using a body-on-frame construction. In such cases, a plurality of individual body panels are mounted on a rigid frame. Relatively large nominal gaps are provided between neighboring body panels due to large assembly variation and dynamic gap requirements during vehicle operation. The size of these gaps vary during the operation of the vehicle. One area of a truck in which such a gap is present is between the cabin and the deck. A static seal is used to reduce the size of the gap to minimize aerodynamic losses. The static seal is typically fixed in place on the deck using clips or tape.

SUMMARY

In one respect, the subject matter described herein relates to a method of actively managing an interface gap between a first vehicle component and a second vehicle component. The interface gap can have an associated width that is variable during vehicle operation. An interface seal can be located at least partially within the first vehicle component. The interface seal can be movable between a stowed position and a deployed position. The method can include detecting a vehicle condition and/or an environment condition. The method can include, responsive to determining that the vehicle condition or the environment condition meets a seal stowage threshold, causing the interface seal to be moved into or maintained in the stowed position. As a result, the interface seal can be located substantially entirely within the first vehicle component. The method can include, responsive to determining that the vehicle condition or the environment condition does not meet the seal stowage threshold, causing the interface seal to be moved into or maintained in the deployed position. In such case, the interface seal can extend at least partially out of the first vehicle component in a direction toward the second vehicle component. Thus, the width of the interface gap can be reduced.

In another respect, the subject matter described herein relates to an active seal system for a vehicle interface. The system can include a first vehicle component and a second vehicle component. The second vehicle component can be located proximate to the first vehicle component. An interface gap can be defined between the first vehicle component and the second vehicle component. The interface gap can have an associated width. The width of the interface gap can be variable during vehicle operation. The system can include an interface seal. The interface seal can be located at least partially within the first vehicle component. The interface seal can be movable between a stowed position and a deployed position. When in the stowed position, the interface seal can be located substantially entirely within the first vehicle component. When in the deployed position, the interface seal can extend at least partially out of the first vehicle component in a direction toward the second vehicle component. Thus, the width of the gap can be reduced.

DETAILED DESCRIPTION

This detailed description relates to seals for gaps formed at interfaces between vehicle components, particularly dynamic gaps in which the width of the gap changes during vehicle operation. Arrangements described herein can allow for the active management of the interface gap using an interface seal. The interface seal can be selectively moved between a stowed position and a deployed position. In some instances, the interface seal can be located in a stowed position in which the interface seal is not located within the interface gap. When in the stowed position, contact between the interface seal and the vehicle components can be avoided, thereby minimizing seal wear and surface wear on the vehicle components. In other instances, the interface seal can be located in a deployed position in which the interface seal can extend into the interface gap. When in the deployed position, the size of the interface gap can be reduced to improve vehicle aerodynamics and efficiency. The present detailed description relates to apparatus and/or systems that incorporate one or more of such features.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
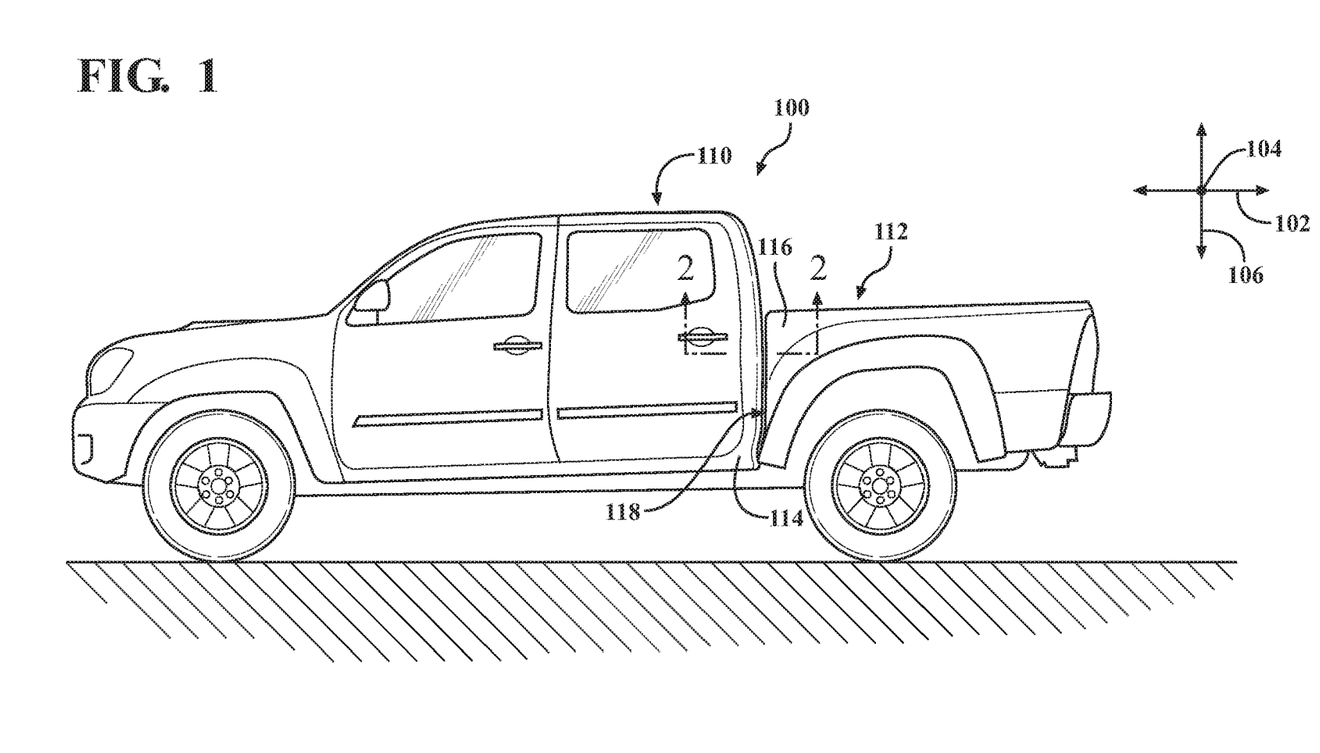
FIG. 1 is an example of a pick-up truck.

FIG. 1 shows an example of a vehicle 100 in which an interface seal can be used. As used herein, "vehicle" means any form of motorized transport. In one or more implementations, the vehicle 100 can be a pick-up truck or a sport utility vehicle. While arrangements will be described herein with respect to a pick-up truck, it will be understood that embodiments are not limited to pick-up trucks.

The vehicle 100 can have an associated longitudinal direction 102. The longitudinal direction 102 can generally extend in the forward-aft direction of the vehicle 100. The vehicle 100 can have an associated lateral direction 104, which can be substantially perpendicular to the longitudinal direction 102. As used herein, the term "substantially" includes exactly the term it modifies and slight variations therefrom. The lateral direction 104 can generally extend in the left-right direction of the vehicle 100 (i.e., into and out of the page in FIG. 1). The vehicle 100 can have an associated elevational direction 106. The elevational direction 106 can generally extend in the top-bottom direction of the vehicle 100.

The vehicle 100 can include a first vehicle component 110 and a second vehicle component 112. The first vehicle component 110 and the second vehicle component 112 can be any suitable vehicle components. For example, the first vehicle component 110 and the second vehicle component 112 can be located on and/or can define at least in part an exterior of the vehicle 100. In one or more arrangements, the first vehicle component 110 can be a cabin 114, which can be a compartment or seating area for passengers. The cabin 114 can be defined by one or more components.

In one or more arrangements, the second vehicle component 112 can be a deck 116 (which can also be referred to as a bed). The deck 116 can be an open top cargo area. The deck 116 can allow the vehicle 100 to be utilized in many different ways, including carrying or storing various types of cargo (e.g., tools, groceries, sporting equipment, etc.). The deck 116 can be open topped. In some instances, the open top of the deck 116 can be closed by a tonneau cover or other element. The deck 116 can be defined by one or more components.

The first vehicle component 110 and the second vehicle component 112 can be arranged relative to each other in any suitable manner. The first vehicle component 110 and the second vehicle component 112 can be spaced from each other in one or more directions. In the example shown in FIG. 1, the first vehicle component 110 and the second vehicle component 112 can be spaced from each other in the longitudinal direction 102 of the vehicle. An interface 118 can be formed between the first vehicle component 110 and the second vehicle component 112.

Figure 2:
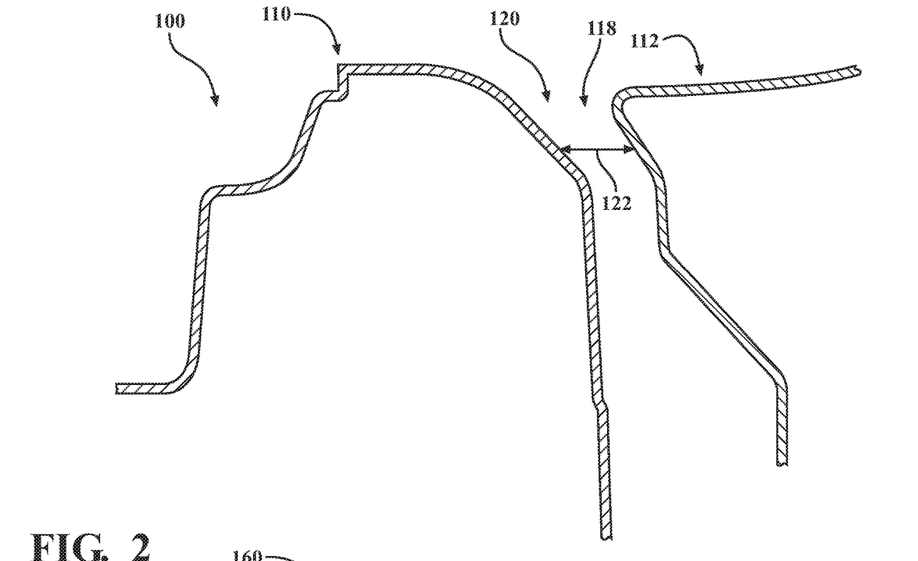
FIG. 2 is a cross-sectional view through a portion of the pick-up truck, viewed along line 2-2 in FIG. 1, and showing an example of an interface between a cab and a deck.

Referring to FIG. 2, the interface 118 can include an interface gap 120. The interface gap 120 can be formed by the spacing between the cabin 114 and the deck 116. The interface gap 120 can have an associated width 122. In some arrangements, the width 122 of the interface gap 120 can be substantially uniform along the interface 118 between the cabin 114 and the deck 116. In some arrangements, the width 122 of the interface gap 120 can be non-uniform, as is shown in FIG. 2.

In one or more arrangements, the cabin 114 and the deck 116 can move relative to each other at least during the operation of the vehicle 100. Thus, the width 122 of the interface gap 120 can vary. The presence of the interface gap 120 can negatively influence the vehicle aerodynamics (e.g., turbulence can be generated at or near the interface gap 120), which, in turn, can lower gas mileage and reduce overall vehicle efficiencies.

Figure 3:
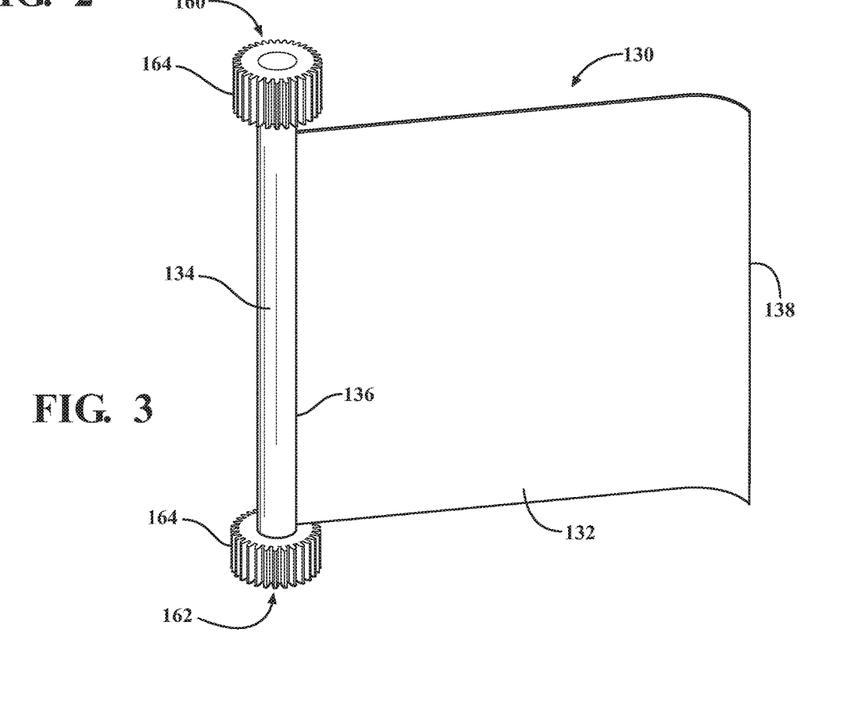
FIG. 3 is an example of an interface seal.

According to arrangements herein, an interface seal can be used in connection with the interface 118 to at least reduce the size of the interface gap 120 during operation of the vehicle 100. The interface seal can have any suitable form. FIG. 3 shows one example of an interface seal 130. The interface seal 130 can include a seal body 132 and a carrier 134. The seal body 132 can include a proximal side 136 and a distal side 138. The terms "proximal" and "distal" are used to indicate the relative position of the sides with respect to the carrier 134.

The seal body 132 can have any suitable configuration. In one or more arrangements, the seal body 132 can have a substantially rectangular conformation. In one or more arrangements, the distal side 138 of the seal body 132 can be substantially identical to the proximal side 136 of the seal body 132. Alternatively the distal side 138 can be different from the proximal side 136 in one or more respects. For instance, the distal side 138 can be tapered and/or curved, as is shown in FIG. 3.

The seal body 132 can have any suitable cross-sectional shape. For example, the seal body 132 can have a substantially rectangular cross-sectional shape. The seal body 132 can have any suitable thickness. The thickness of the seal body 132 can be substantially uniform, or the thickness of the seal body 132 can be non-uniform. In one or more arrangements, the seal body 132 can be from about 2.5 inches to about 3 inches in thickness.

The seal body 132 can be sized so as to extend substantially the entire length of the interface 118 in the elevational direction 106. In one or more arrangements, the seal body 132 can be sized to extend a substantial majority of the length of the interface 118 in the elevational direction 106.

The seal body 132 can be made of any suitable material. In one or more arrangements, the seal body 132 can be made of a flexible material. For instance, the seal body 132 can be made of ethylene propylene diene monomer (EPDM), rubber, or a resin material, just to name a few possibilities.

As noted above, the interface seal 130 can include a carrier 134. The carrier 134 can provide support to the seal body 132 and/or can facilitate movement of the interface seal 130, as will be described herein. The carrier 134 can be used to facilitate movement of the interface seal 130 between stowed and deployed positions. The carrier 134 can be made of a rigid material. In one or more arrangements, the carrier 134 can be made of metal, such as steel. The carrier 134 can be a substantially solid body, or at least a portion of the carrier 134 can be hollow.

The seal body 132 can be operatively connected to the carrier 134 in any suitable manner. For instance, the seal body 132 can be operatively connected to the carrier 134 by one or more fasteners, one or more adhesives, and/or one or more forms of mechanical engagement, just to name a few possibilities. In one or more arrangements, the proximal side 136 of the seal body 132 can be operatively connected to the carrier 134. However, it will be appreciated that additional and/or alternative portions of the seal body 132 can be operatively connected to the carrier 134. The term "operatively connected," as used throughout this description, can include direct or indirect connections, including connections without direct physical contact.

Figure 4:
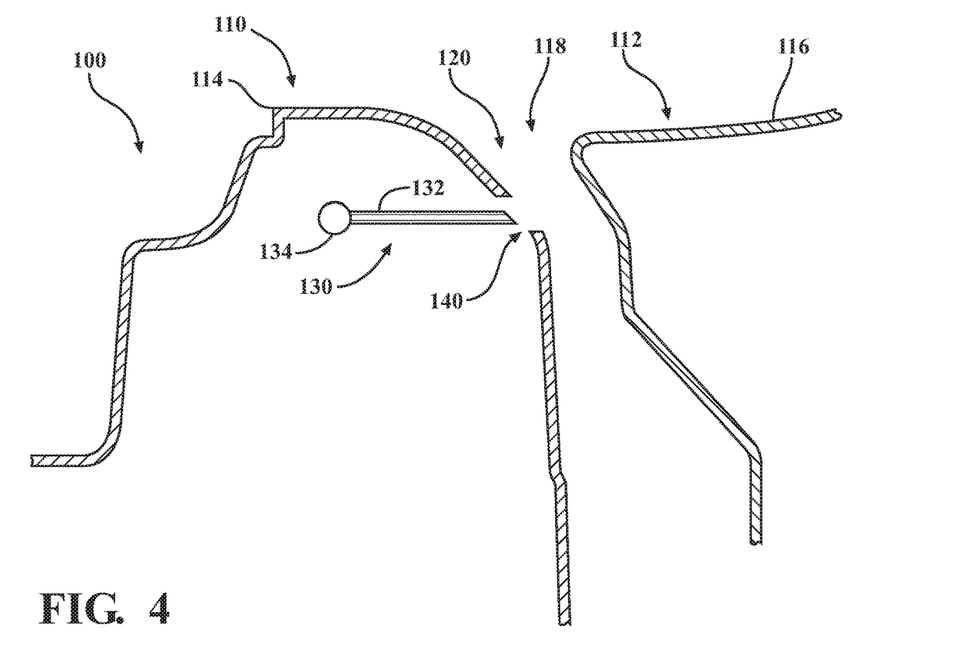
FIG. 4 is an example of the interface between the cab and the deck of the pick-up truck, showing an example of the interface seal in a stowed position.
Figure 5:
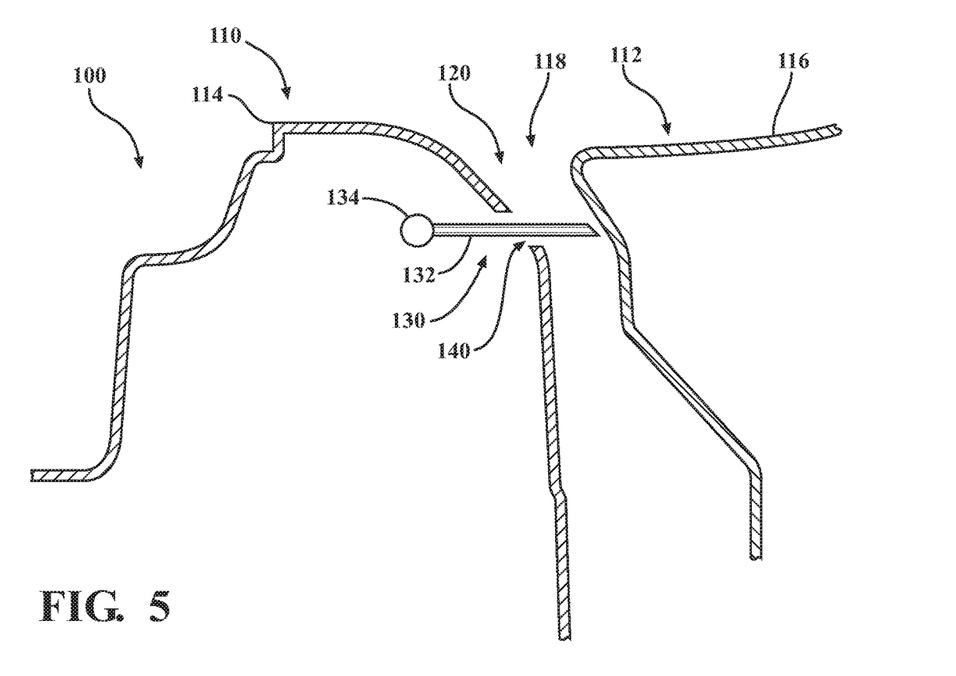
FIG. 5 is an example of the interface between the cab and the deck of the pick-up truck, showing an example of the interface seal in a deployed position.

The interface seal 130 can be movable between a stowed position and a deployed position. FIGS. 4 and 5 show the interface seal 130 in the stowed position and the deployed position, respectively. In one or more arrangements, when in the stowed position, the interface seal 130 can be located entirely inside of one of the vehicle components (e.g., the cabin 114 in FIG. 4). In such case, the interface seal 130 is not visible from outside the vehicle 100. In one or more arrangements, when in the stowed position, a substantial majority of the interface seal 130 can be located inside of the cabin 114.

In the deployed position, at least a portion of the interface seal 130 can extend out of the cabin 114 and into the interface gap 120. The interface seal 130 can extend generally toward the deck 116. In the deployed position, a majority of the interface seal 130 can be located outside of the respective vehicle component (e.g., the cabin 114 in FIG. 5). In some instances, the deployed position can correspond to a maximum extended position of the interface seal 130. In one or more arrangements, when in the maximum extended position, the distal side 138 of the interface seal 130 can be spaced from the deck 116. Thus, the distal side 138 of the interface seal 130 does not contact the deck 116. Any suitable spacing can be provided. For instance, the spacing can be about 5 millimeters or less. In one or more arrangements, the interface seal 130 can have a one or more intermediate positions between the stowed position and the deployed position. In such intermediate positions, at least a portion of the interface seal 130 extends outside of the cabin 114 and into the interface gap 120 and can extend generally toward the deck 116, but the interface seal 130 is not in a maximum extended position.

It will be appreciated that, while FIGS. 4 and 5 show the interface seal 130 as being located within the cabin 114, the interface seal 130 can alternatively be located within the deck 116. The cabin 114 or deck 116 can include an aperture 140 through which the interface seal 130 can pass as the interface seal 130 is moved into and out of the stowed position and/or the deployed position. The aperture 140 can be formed in any suitable manner, such as by stamping, punching, or cutting. The aperture 140 can have any suitable size, shape, and/or configuration to allow for substantially unimpeded movement of the interface seal 130. In some instances, the aperture 140 can be sealed to keep the interior of the respective vehicle component dry and/or to prevent the infiltration of dirt or other unwanted substances. For example, if the interface seal 130 is located in the cabin 114, then aperture 140 can be sealed. Any suitable type of sealing system or elements, now known or later developed, can be used. If the interface seal 130 is located in the deck 116, the aperture 140 may or may not be sealed.

Further, while the interface seal 130 is shown as being used in the interface gap 120 on one side of the vehicle 100, it will be appreciated that, alternatively or in addition, the interface seal 130 can be used on the other side of the vehicle 100. Thus, the description of the interface seal 130 herein is applicable to both sides of the vehicle 100. When interface seals 130 are used on opposite side of the vehicle 100, the interface seals 130 can be operated independently of each other, or they can be operated in a coordinated manner.

Figure 6:
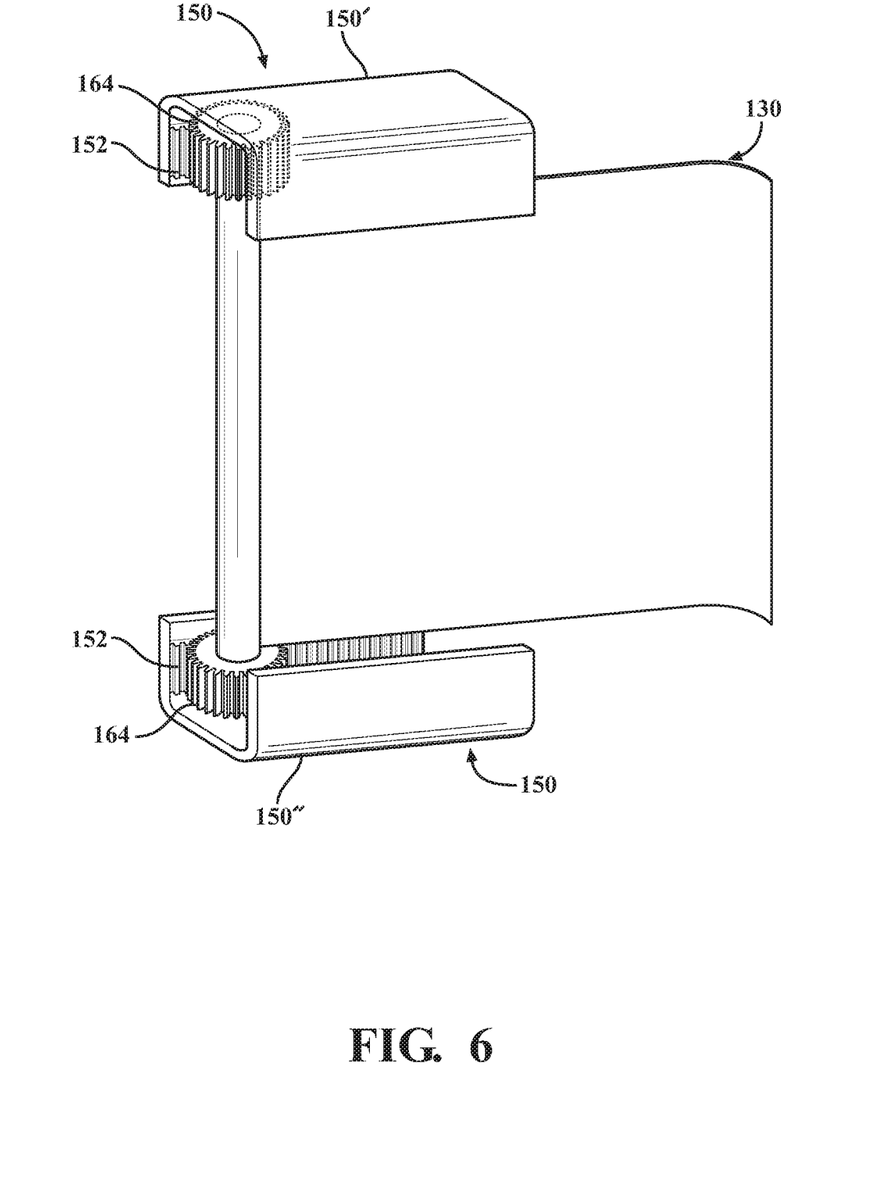
FIG. 6 is an example of a system in which the interface seal is movable along guide rails.

The interface seal 130 can be moved into and out of the stowed position and/or the deployed position in any suitable manner. As an example, the interface seal 130 can be configured to be moved along guide rails 150, as is shown in FIG. 6. The guide rails 150 can be made of any suitable material, such as aluminum, steel or some other rigid material. The guide rails 150 can be made in any suitable manner. For instances, they can be made by roll form, extrusion, and/or stamping.

The guide rails 150 can have any suitable configuration. For instance, the guide rails 150 can be substantially C-shaped or substantially U-shaped in configuration. In one or more arrangements, there can be a first guide rail 150' and a second guide rail 150". The first guide rail 150' and the second guide rail 150" can be substantially parallel to each other. The first guide rail 150' and the second guide rail 150" can extend in substantially the longitudinal direction 102 of the vehicle 100. The first guide rail 150' and the second guide rail 150" can be arranged so that they open toward each other, as shown in FIG. 6.

The guide rails 150 can be operatively connected to the first vehicle component 110 or the second vehicle component 112. For instance, the guide rails 150 can be operatively connected to the cabin 114 or the deck 116. The guide rails 150 can be operatively connected to the first vehicle component 110 or the second vehicle component 112 in any suitable manner, such as by welding, brazing, one or more fasteners, one or more adhesives, and/or one or more forms of mechanical engagement, just to name a few possibilities.

The interface seal 130 and/or the guide rails 150 can be configured to facilitate movement of the interface seal 130 into and out of the stowed position and/or the deployed position. Such movement can be achieved in any suitable manner. For example, referring to FIG. 3, a first end 160 and/or a second end 162 of the carrier 134 can include a gear 164. The guide rails 150 can include gear track 152 (FIG. 6). Thus, the gears 164 of the carrier 134 can engage the gear tracks 152 for movement along the guide rails 150. In one or more arrangements, there can be one or more motors 170 (FIG. 7) operatively connected to at least one of the gears 164 of the carrier 134. The motor(s) 170 can be selectively activated to cause rotation of the at least one gear 164 of the carrier 134 so as to cause the interface seal 130 to move along the guide rails 150 toward the stowed position or the deployed position. The motor(s) 170 can be activated responsive to receiving signals or other inputs from one or more vehicle sources, as will be described later. The motor(s) 170 can be provided on the interface seal 130 (e.g., within the carrier 134), on at least one of the guide rails 150, and/or in any other suitable location.

As another example, there can be one or more actuators, one or more pistons, one or more push/pull bars, one or more pulleys, and/or one or more magnets operatively connected to the carrier 134. The actuator(s), piston(s), push/pull bar(s), pulley(s), and/or magnet(s) can be selectively activated to cause the interface seal 130 to be moved into and out of the stowed position and/or the deployed position. The one or more actuators can include pneumatic actuators, hydraulic pistons, relays, solenoids, and/or piezoelectric actuators, just to name a few possibilities. The actuator(s), piston(s), push/pull bar(s), pulley(s), and/or magnet(s) can be used in instances in which the carrier 134 includes the gears 164 or in instances in which the carrier 134 does not include gears 164. The actuator(s), piston(s), push/pull bar(s), pulley(s), and/or magnet(s) can be activated responsive to receiving signals or other inputs from one or more vehicle sources.

However, it will be appreciated that the use of gears 164 is merely one example of a manner in which the interface seal 130 can be caused to move into and out of the stowed position and/or the deployed position. For instance, in some arrangements, the interface seal 130 can include one or more rollers, one or more wheels, one or more sliders, one or more ball bearings, and/or one or more magnets, just to name a few possibilities.

Figure 7:
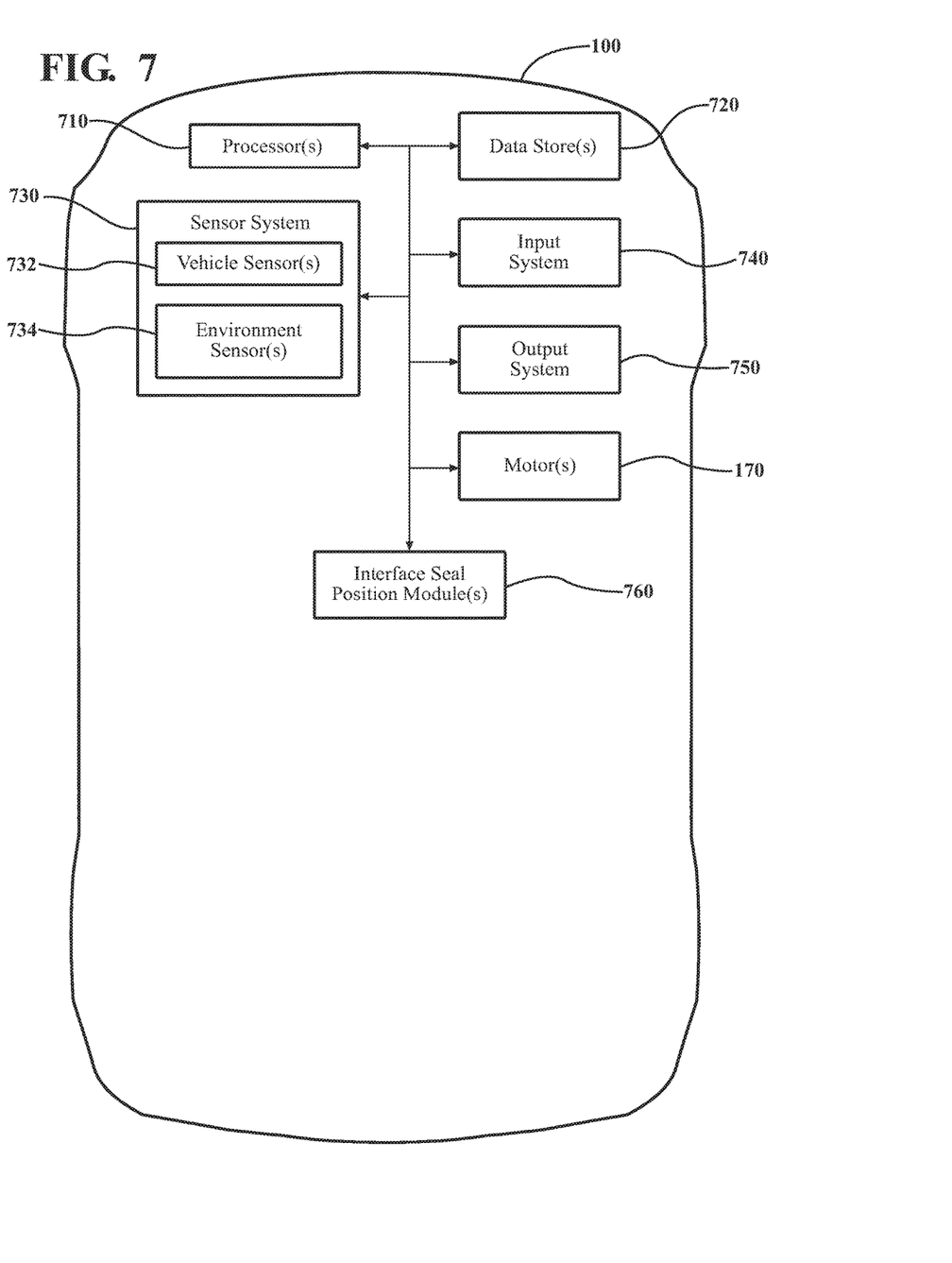
FIG. 7 shows examples of additional elements of the pick-up truck.

The vehicle 100 can include various elements that at least partially relate to the interface seal 130. Some of the possible elements of the vehicle 100 are shown in FIG. 7 and will now be described. It will be understood that it is not necessary for the vehicle 100 to have all of the elements shown in FIG. 7 or described herein. The vehicle 100 can have any combination of the various elements shown in FIG. 7. Further, the vehicle 100 can have additional elements to those shown in FIG. 7. In some arrangements, the vehicle 100 may not include one or more of the elements shown in FIG. 7. Further, while the various elements are shown as being located within the vehicle 100 in FIG. 7, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The vehicle 100 can include one or more processors 710. "Processor" means any component or group of components that are configured to execute any of the processes described herein or any form of instructions to carry out such processes or cause such processes to be performed. The processor(s) 710 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 710 can include at least one hardware circuit (e.g., an integrated circuit) configured to carry out instructions contained in program code. In arrangements in which there is a plurality of processors 710, such processors can work independently from each other or one or more processors can work in combination with each other. In one or more arrangements, the processor(s) 710 can be a main processor of the vehicle 100.

The vehicle 100 can include one or more data stores 720 for storing one or more types of data. The data store(s) 720 can include volatile and/or non-volatile memory. Examples of suitable data stores 720 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 720 can be a component of the processor(s) 710, or the data store(s) 720 can be operatively connected to the processor(s) 710 for use thereby.

As noted above, the vehicle 100 can include the sensor system 730. The sensor system 730 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 730 includes a plurality of sensors, the sensors can work independently from each other. Alternatively, two or more of the sensors can work in combination with each other. In such case, the two or more sensors can form a sensor network. The sensor system 730 and/or the one or more sensors can be operatively connected to the processor(s) 710, the data store(s) 720, and/or other element of the vehicle 100 (including any of the elements shown in FIG. 7).

The sensor system 730 can include any suitable type of sensor. For instance, the sensor system 730 can include one or more vehicle sensors 732, which can be configured to acquire, detect, determine, assess, monitor, measure, quantify and/or sense information about the vehicle 100 itself (e.g., position, location, orientation, speed, acceleration, deceleration, accelerator pedal position, brake pedal position, etc.). In one or more arrangements, the vehicle sensor(s) 732 can include a speedometer. In one or more arrangements, the vehicle sensor(s) 732 can include one or more sensors (e.g., proximity sensor(s), infrared sensor(s), etc.) to detect movement or relative movement of one or more vehicle components. For instance, one or more of such sensors could be provided on one of the first vehicle component 110 or the second vehicle component 112, and such sensor(s) can detect relative movement of the other one of the first vehicle component 110 or the second vehicle component 112.

Alternatively or in addition, the sensor system 730 can include one or more environment sensors 734, which can be configured to acquire, detect, determine, assess, monitor, measure, quantify and/or sense data or information about the external environment in which a vehicle is located or one or more portions thereof. For example, such data or information can include wind speed, road conditions, etc. In one or more arrangements, the environment sensor(s) 734 can include an air/wind speed sensor.

The vehicle 100 can include an input system 740. An "input system" includes any device, component, system, element or arrangement or groups thereof that enable information/data to be entered into a machine. The input system 740 can be configured to receive an input from a vehicle occupant (e.g. a driver or a passenger). The vehicle 100 can include an output system 750. An "output system" includes any device, component, system, element or arrangement or groups thereof that enable information/data to be presented to a vehicle occupant (e.g. a person, a vehicle occupant, etc.). The output system 750 can be configured to present information/data to a vehicle occupant. Some components of the vehicle 100 may serve as both a component of the input system 740 and a component of the output system 750.

The vehicle 100 can include one or more modules. The modules can be implemented as computer readable program code that, when executed by a processor, implement one or more of the various processes described herein. One or more of the modules can be a component of the processor(s) 710, or one or more of the modules can be executed on and/or distributed among other processing systems to which the processor(s) 710 is operatively connected. The modules can include instructions (e.g., program logic) executable by one or more processor(s) 710. Alternatively or in addition, one or more data store 720 may contain such instructions. The modules described herein can include artificial or computational intelligence elements, e.g., neural network, fuzzy logic or other machine learning algorithms.

The vehicle 100 can include one or more interface seal position modules 760. The interface seal position module(s) 760 can be configured to perform various functions. The interface seal position module(s) 760 can be configured to receive and/or acquire data relating to conditions, parameters, and/or factors that may affect the aerodynamics of the vehicle 100 with respect to the interface gap 120. The interface seal position module(s) 760 can receive and/or acquire data from the sensor system 730, the data store(s) 720, and/or any other source of information relating to the vehicle 100 and/or the external environment of the vehicle 100. The interface seal position module(s) 760 can use such information to determine a suitable position for the interface seal 130.

The interface seal position module(s) 760 can be configured to cause, directly or indirectly, the movement of the interface seal 130 to a desired position. As used herein, "cause" or "causing" means to make, force, compel, direct, command, instruct, and/or enable an event or action to occur or at least be in a state where such event or action may occur, either in a direct or indirect manner. The interface seal position module(s) 760 can be configured to execute various vehicle functions and/or to transmit data to, receive data from, interact with, and/or control the vehicle 100 or one or more systems or components thereof (e.g. motor(s) 170, actuator(s), etc.).

In one or more arrangements, the interface seal position module(s) 760 can be configured to cause the movement of the interface seal 130 based at least in part on a detected condition or state of the vehicle 100, a detected condition or state of the external environment of the vehicle 100, and/or other factor(s). Such condition(s) and/or factor(s) can be assessed relative to a seal stowage threshold. If the condition(s) and/or factor(s) meet the seal stowage threshold, then the interface seal position module(s) 760 can be configured to cause the interface seal 130 to be moved into or be maintained in the stowed position. If the condition(s) and/or factor(s) do not meet the seal stowage threshold, then the interface seal position module(s) 760 can be configured to cause the interface seal 130 to be moved into or be maintained in the deployed position. In one or more arrangements, the causing of the movement of the interface seal 130 can be performed automatically by the interface seal position module(s) 760 and/or the processor(s) 710. In one or more arrangements, a vehicle occupant can be prompted for approval to cause the movement of the interface seal 130.

The interface seal position module(s) 760 can determine a suitable position for the interface seal 130 based on data obtained by one or more sensors of the sensor system 730. Various examples will now be described. In one or more arrangements, the position of the interface seal 130 can be based at least partially on the current speed of the vehicle 100. Generally, the interface seal 130 can be moved into or remain in the deployed position when the vehicle 100 is traveling at low speeds, and the interface seal 130 can be moved into or remain in the stowed position when the vehicle 100 is traveling at high speeds. The current speed of the vehicle 100 can be determined in any suitable manner, now know or later developed. For instance, the current speed of the vehicle 100 can be determined by a speedometer or other speed sensor. The current speed of the vehicle 100 can be determined continuously, periodically, irregularly, or even randomly.

The interface seal position module(s) 760 and/or the processor(s) can assess the current speed relative to a seal stowage threshold, which can be a speed threshold. Any suitable speed threshold can be used to determine whether the vehicle 100 is traveling at a low speed or a high speed. For instance, the threshold speed can be about 45 miles per hour, about 50 miles per hour, about 55 miles per hour, or about 60 miles per hour, just to name a few possibilities. If the current speed of the vehicle 100 is above the threshold speed, then the vehicle 100 is determined to be traveling at a high speed. If the current speed of the vehicle 100 is below the threshold speed, then the vehicle 100 is determined to be traveling at a low speed. If the current speed of the vehicle 100 is equal to the threshold speed, then the vehicle 100 can be determined to be traveling at either a high speed or a low speed. The determination of whether the current speed of the vehicle 100 is a high speed or a low speed can be determined continuously, periodically, irregularly, or even randomly.

In one or more arrangements, the position of the interface seal 130 can be based at least partially on the air/wind speed in the external environment of the vehicle 100. Generally, the interface seal 130 can be moved into or remain in the deployed position when low wind speeds are detected, and the interface seal 130 can be moved into or remain in the stowed position when high wind speeds are detected. Any suitable threshold speed can be used to determine whether the air speed is high or low. The air/wind speed can be determined in any suitable manner, now know or later developed. For instance, the air/wind speed can be determined by an air/wind speed sensor, which can be provided in any suitable location on the vehicle 100. The air/wind speed can be determined continuously, periodically, irregularly, or even randomly.

The interface seal position module(s) 760 and/or the processor(s) can assess the current air/wind speed to a seal stowage threshold, which can be an air/wind speed threshold. Any suitable air/wind speed threshold can be used. If the current air/wind speed is above the air/wind speed threshold, then it can be determined that high air/wind speeds are present. If the current air/wind speed is below the air/wind speed threshold, then it can be determined that low air/wind speeds are present. If the current air/wind speed is equal to the air/wind speed threshold, then it can be determined either that the air/wind speeds are either high or low. The determination of whether the current air/wind speeds are high or low can be determined continuously, periodically, irregularly, or even randomly.

In one or more arrangements, the position of the interface seal 130 can be based at least in part on the relative movement between the cabin 114 and the deck 116. The relative movement can be detected in any suitable manner, now know or later developed. For example, one or more sensors (e.g., proximity sensor(s), infrared sensor(s), camera(s), etc.) can be located on one of the cabin 114 or the deck 116. The sensors can detect the movement of the opposite one of the cabin 114 or the deck 116. When there are large movements of the cabin 114 or the deck 116, the interface seal 130 can be moved into or can be maintained in the stowed position. However, when there are small movements of the cabin 114 or the deck 116, the interface seal 130 can be moved into or can be maintained in the deployed position.

The determination of whether the movement of the cabin 114 or the deck 116 is large or small can be made with respect to a seal stowage threshold, which can be a relative movement threshold. The relative movement threshold can be any suitable value. For instance, the relative movement threshold can be about 1 millimeter, about 2 millimeters, or about 3 millimeters, just to name a few possibilities. The relative movement of the cabin 114 or the deck 116 and/or the determination of whether such movement is large or small can be determined continuously, periodically, irregularly, or even randomly.

In one or more arrangements, the position of the interface seal 130 can be based at least in part on the conditions of the road on which the vehicle 100 is currently traveling. Generally, the interface seal 130 can be moved into or remain in the stowed position when the vehicle is traveling on a rough road (e.g., a dirt road, lots of pot holes, etc.). The interface seal 130 can be moved into or remain in the deployed position when the vehicle 100 is traveling on a smooth road. In one or more arrangements, the vehicle 100 can obtain such information by one or more environment sensors 734 (e.g., radar sensor(s), lidar sensor(s), sonar sensor(s), camera(s), etc.). Alternatively or in addition, the vehicle 100 can obtain such information from any suitable source of such information or data. The information or data can be obtained from the one or more data stores 720. Alternatively or in addition, the information or data can be obtained from one or more maps, mapping applications, and/or traffic applications. Alternatively or in addition, the vehicle 100 and/or one or more components of the vehicle 100 can be communicatively linked to one or more road data sources through one or more communication networks. The road data source(s) can be any source of road-related information or data. The road data source(s) can be, for example, a road and/or traffic server, a road and/or traffic condition database, a road and/or traffic news source, an online road and/or traffic database (e.g., a road and/or traffic-related website), a publication, a system or a source, as may be available from one or more public agencies (e.g., a national, state or local department of transportation), one or more public groups (e.g., a news reporting agencies) and/or one or more private groups. The vehicle 100 and/or one or more components of the vehicle 100 can be configured to determine or obtain road-related information or data in real-time.

Examples of road-related information or data that can be obtained by the vehicle 100 and/or one or more components of the vehicle 100 can include: road surface type (e.g., paved, dirt, etc.), road conditions, defects (e.g., potholes), etc. The road-related information or data can apply to and/or can be associated with a road and/or one or more individual travel lanes of the road. In one or more arrangements, the vehicle 100 and/or one or more components of the vehicle 100 can obtain historical road-related information or data for a given location.

In one or more arrangements, the movement of the interface seal 130 can be in response to a manual input received from a vehicle occupant. A vehicle occupant may wish for the interface seal 130 to be in a particular position. As an example, if the driver is taking the vehicle 100 in an off-roading environment, then he or she will know that the interface seal is not needed. Accordingly, the vehicle occupant can indicate that the interface seal 130 should be moved into or remain in the stowed position. The vehicle occupant can provide a command using the input system 740 of the vehicle 100. In one or more arrangements, the movement of the interface seal 130 into and out of the stowed and/or deployed positions can be performed automatically by the vehicle 100. In such instances, the command from the vehicle occupant can act as an override. In one or more arrangements, the movement of the interface seal 130 into and out of the stowed position and/or the deployed position can be manual.

When the vehicle 100 is not in use (e.g., the engine is turned off) and/or when the vehicle 100 is in park, the interface seal 130 can be in the stowed position. When such conditions are detected, the interface seal 130 can be caused to be moved into the stowed position or can remain in the stowed position. Thus, the interface seal 130 would not be visible from outside of the vehicle 100. When the vehicle 100 is in use but is not moving (e.g., stopped at a traffic signal or in traffic), the interface seal 130 can be caused to be moved into the deployed position or can remain in the deployed position. In one or more arrangements, the interface seal 130 can be caused to be moved into the deployed position at vehicle start-up.

Now that the various potential systems, devices, elements and/or components of the vehicle 100 have been described, various methods will now be described. Various possible steps of such methods will now be described. The methods described may be applicable to the arrangements described above in relation to FIGS. 1-7, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
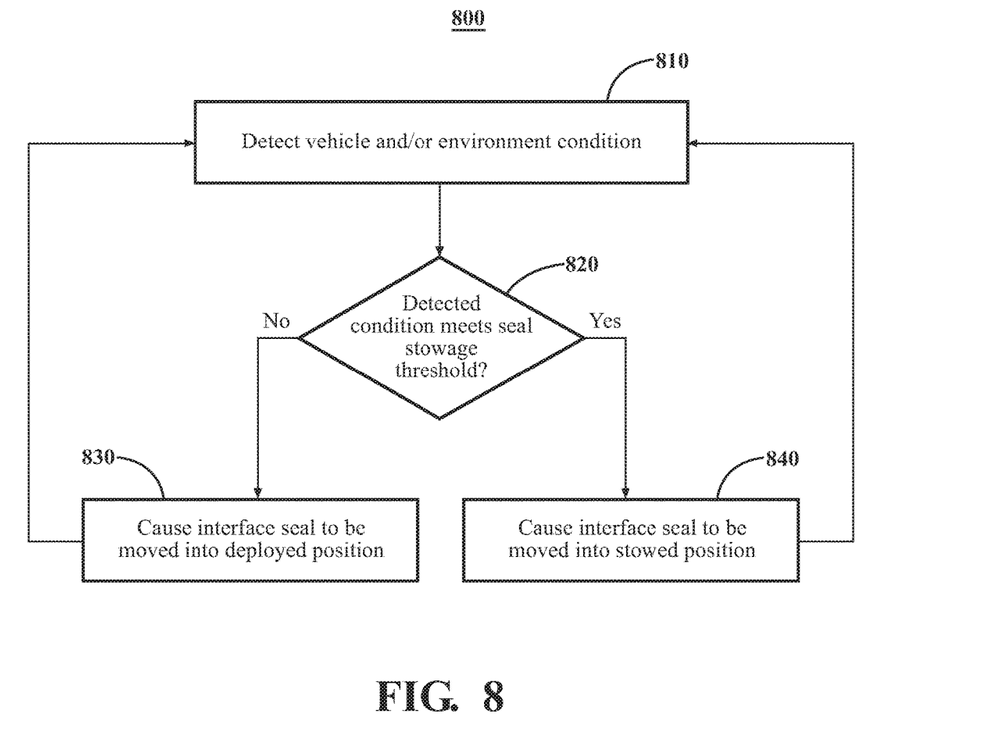
FIG. 8 is an example of an active seal method for a dynamic vehicle interface.

Referring now to FIG. 8, an example of an active seal method 800 for a dynamic vehicle interface is shown. At block 810, a vehicle condition and/or an environment condition can be detected. The detecting of the vehicle condition and/or the environment condition can be performed by one or more sensors of the sensor system 730 (e.g., one or more vehicle sensors 732 and/or one or more environment sensors 734). The detecting of the vehicle condition and/or the environment condition can be performed continuously, periodically, irregularly, or randomly. The method 800 can continue to decision block 820.

At decision block 820, it can be determined whether the detected vehicle condition and/or the detected environment condition meets a seal stowage threshold. The seal stowage threshold can be a predetermined threshold. The determination of whether the detected vehicle condition and/or the detected environment condition meets a seal stowage threshold can be performed by the interface seal position module(s) 760 and/or the processor(s) 710. The determination of whether the detected vehicle condition and/or the detected environment condition meets a seal stowage threshold can be performed continuously, periodically, irregularly, or randomly. If the detected vehicle condition and/or the detected environment condition meets a seal stowage threshold, the method can continue to block 830. If the detected vehicle condition and/or the detected environment condition does not meet a seal stowage threshold, the method can continue to block 840.

At block 830, the interface seal 130 can be caused to be moved into the deployed position. The interface seal position module(s) 760 and/or the processor(s) 710 can send control signals to one or more components of the vehicle 100 to cause the interface seal 130 to move into the deployed position. For instance, such control signals can be sent to the motor(s) 170, actuator(s), piston(s), etc. to cause the interface seal 130 to move into the deployed position. If the interface seal 130 is already in the deployed position, then the interface seal 130 can remain in such position.

As block 840, the interface seal 130 can be caused to be moved into the stowed position. The interface seal position module(s) 760 and/or the processor(s) 710 can send control signals to one or more components of the vehicle 100 to cause the interface seal 130 to move into the stowed position. For instance, control signals can be sent to the motor(s) 170, actuator(s), piston(s), etc. to cause the interface seal 130 to move into the stowed position. If the interface seal 130 is already in the stowed position, then the interface seal 130 can remain in such position.

The method 800 can end. Alternatively, the method 800 can return to block 810 or some other block.

A non-limiting example of the operation of the vehicle 100 will now be described. In this example, the seal stowage threshold can be based on vehicle speed. For purposes of this example, the seal stowage threshold can be 45 miles per hour. The vehicle 100 can have interface seals 130 associated with the interface gaps 120 on both lateral sides of the vehicle 100.

The vehicle 100 can be traveling on a road. The speed of the vehicle 100 can be 35 miles per hour, as can be determined by one or more vehicle sensor(s) 732. The interface seal position module(s) 760 and/or the processor(s) 710 can determine that the current speed of the vehicle 100 is below the seal stowage threshold; therefore, the current speed of the vehicle 100 does not meet the seal stowage threshold. Thus, the interface seal 130 should be in the deployed position.

The interface seal position module(s) 760 and/or the processor(s) 710 can send control signals to the motor(s) 170 to cause the interface seal 130 on one or both sides of the vehicle 100 to be moved, if necessary, into the deployed position. In such position, the width 122 of the interface gap 120 can be reduced. As a result, turbulence or non-laminar airflow on the outside of the vehicle 100 at or near the interface gap 120 can be reduced. As a result, aerodynamic performance benefits can be realized.

The speed of the vehicle 100 can continued to be monitored by the one or more vehicle sensor(s) 732. Eventually, the speed of the vehicle 100 may increase to 50 miles per hour. The interface seal position module(s) 760 and/or the processor(s) 710 can determine that the current speed of the vehicle 100 is above the seal stowage threshold; therefore, the current speed of the vehicle 100 meets the seal stowage threshold. Thus, the interface seal 130 should be in the stowed position.

The interface seal position module(s) 760 and/or the processor(s) 710 can send control signals to the motor(s) 170 to cause the interface seal 130 on one or both sides of the vehicle 100 to be moved, if necessary, into the stowed position. In such position, the interface seal 130 is not located within the interface gap 120. As a result, regardless of the relative movement between the cabin 114 and the deck 116, the interface seal 130 will not come into contact with the cabin 114 or the deck 116.

Such monitoring of the speed of the vehicle 100 can continue while the vehicle 100 is in operation. The interface seals 130 can be caused to be moved into the stowed position or into the deployed position based on the current speed of the vehicle 100. When the vehicle 100 reaches its destination, the transmission of the vehicle 100 can be placed in park. When the transmission gear selection of park is detected, the interface seals 130 can be caused to be moved into the stowed position so as to be out of view.

In contrast to the above example, if the interface seal 130 were merely a static seal, relative movement between the cabin 114 and deck 116, during high vehicle speeds or otherwise, can cause the static seal to come into direct contact with the cabin 114 or the deck 116. Such contact can cause wearing of interface seal, a reduced life cycle of the interface seal, wearing of the paint of the cabin 114 or the deck 116, corrosion in areas in which the paint has been worn away, and noise when contact between the interface seal 130 and the cabin 114 or the deck 116 occurs.

It will be appreciated that arrangements described herein can provide numerous benefits, including one or more of the benefits mentioned herein. For example, arrangements described herein can improve the aerodynamic performance of a vehicle. When the interface seal is in the deployed position, turbulence or non-laminar airflow on the outside of the vehicle at the cabin-deck interface can be reduced. Such improved vehicle aerodynamics can, in turn, improve vehicle fuel economy and/or overall vehicle efficiencies. Arrangements described herein can avoid contact between the interface seal and the vehicle components during certain operational conditions. When the interface seal is in the stowed position, interface seal wear, vehicle paint wear, vehicle body corrosion, and/or noise can be avoided.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of actively managing a dynamic interface of a vehicle, the interface including an interface gap defined between a first vehicle component and a second vehicle component, the interface gap having an associated width that is variable during vehicle operation, an interface seal being located at least partially within the first vehicle component, the interface seal being movable between a stowed position and a deployed position, the first vehicle component including an aperture through which the interface seal can be moved into and out of the stowed position and the deployed position, the method comprising:
    detecting a vehicle condition or an environment condition;
    when the vehicle condition or the environment condition meets a seal stowage threshold, causing the interface seal to be moved into or maintained in the stowed position in which the interface seal is located substantially entirely within the first vehicle component; and
    when the vehicle condition or the environment condition does not meet the seal stowage threshold, causing the interface seal to be moved into or maintained in the deployed position such that the interface seal extends at least partially out of the first vehicle component in a direction toward the second vehicle component to reduce the width of the interface gap;
    wherein the environment condition is air speed in an external environment of the vehicle;
    wherein the vehicle condition is a movement of the second vehicle component relative to the first vehicle component.

2. The method of claim 1, wherein, in the deployed position, the interface seal does not touch the second vehicle component.

3. The method of claim 1, wherein, in the stowed position, the interface seal is located entirely within the first vehicle component, whereby the interface seal is not visible from outside the vehicle.

4. The method of claim 1, wherein the vehicle condition is current vehicle speed.

5. The method of claim 1, wherein the interface seal is movable responsive to an input received from a vehicle occupant.

6. The method of claim 1, further including:
    responsive to detecting that a vehicle transmission is in park or a vehicle engine is off, causing the interface seal to be moved into or maintained in the stowed position.

7. An active seal system for an interface of a vehicle, the system comprising:
    a first vehicle component;
    a second vehicle component located proximate to the first vehicle component, a gap being defined between the first vehicle component and the second vehicle component, the gap having an associated width, whereby the width of the gap is variable during vehicle operation; and
    an interface seal, the interface seal being located at least partially within the first vehicle component, the interface seal being movable between a stowed position and a deployed position,
    when in the stowed position, the interface seal being located substantially entirely within the first vehicle component, and
    when in the deployed position, the interface seal extending at least partially out of the first vehicle component in a direction toward the second vehicle component, such that the width of the gap is reduced the first vehicle component including an aperture through which the interface seal can be moved into and out of the stowed position and the deployed position;
    Wherein, the detected condition is an air speed in an external environment of the vehicle;
    wherein the detected condition is a movement of the second vehicle component relative to the first vehicle component.

8. The system of claim 7, wherein the vehicle is a pick-up truck, wherein the first vehicle component is a cabin, and wherein the second vehicle component is a deck.

9. The system of claim 8, wherein the cabin includes an aperture through which the interface seal can be moved into and out of the stowed position and the deployed position.

10. The system of claim 7, wherein the vehicle is a pick-up truck, wherein the first vehicle component is a deck, and wherein the second vehicle component is a cabin.

11. The system of claim 7, wherein, in the deployed position, the interface seal does not touch the second vehicle component.

12. The system of claim 7, wherein, in the stowed position, the interface seal is located entirely within the first vehicle component, whereby the interface seal is not visible from outside the vehicle.

13. The system of claim 7, further including a processor, the processor being configured to cause the interface seal to be moved based at least partially on whether a detected condition meets a seal stowage threshold.

14. The system of claim 13, wherein the detected condition is a current vehicle speed.

15. The system of claim 7, wherein the interface seal is movable responsive to an input received from a vehicle occupant.

16. The system of claim 7, further including a guide rail, wherein the guide rail includes a gear track, wherein the interface seal include one or more gears operatively engaging the gear tracks.

* * * * *

UNITED STATES PATENT AND TRADEMARK OFFICE
CERTIFICATE OF CORRECTION

PATENT NO. : 10,577,032 B2
APPLICATION NO. : 15/602177
DATED : March 3, 2020
INVENTOR(S) : Scott L. Frederick and Scott P. Robison It is certified that error appears in the above-identified patent and that said Letters Patent is hereby corrected as shown below:

On the Title Page

Below the Abstract, delete "16 Claims, 6 Drawing Sheets" and insert --15 Claims, 6 Drawing Sheets--

In the Claims

Claim 1, Column 15, Line 16: delete "the interface" and insert --the dynamic interface--

Claim 1, Column 15, Line 18: delete "an associated width" and insert --a width--

Claim 1, Column 15, Line 39: delete "gap;" and insert --gap,--

Claim 1, Column 15, Line 40: delete "wherein"

Claim 1, Column 15, Line 40: delete "condition is air speed" and insert --condition including at least air speed--

Claim 1, Column 15, Line 41: delete "vehicle;" and insert --vehicle, and--

Claim 1, Column 15, Line 42: delete "wherein"

Claim 1, Column 15, Line 42: delete "condition is a movement" and insert --condition including at least a movement--

Claim 4, Column 15, Lines 52-53: delete "condition is current" and insert --condition further includes current--

Claim 7, Column 16, Line 7: delete "an associated width" and insert --a width--

Signed and Sealed this
Thirteenth Day of October, 2020

Andrei Iancu
*Director of the United States Patent and Trademark Office*

CERTIFICATE OF CORRECTION (continued)
U.S. Pat. No. 10,577,032 B2

Claim 7, Column 16, Line 13: delete "a deployed position," and insert --a deployed position based on a detected condition,--

Claim 7, Column 16, Line 16: delete "and"

Claim 7, Column 16, Lines 20-21: delete "component, such that" and insert --component such that--

Claim 7, Column 16, Line 21: delete "reduced" and insert --reduced,--

Claim 7, Column 16, Line 23: delete "can be moved" and insert --is movable--

Claim 7, Column 16, Line 24: delete "position;" and insert --position, and--

Claim 7, Column 16, Line 25: delete "Wherein,"

Claim 7, Column 16, Line 25: delete "condition is an air speed" and insert --condition including at least one of an air speed--

Claim 7, Column 16, Line 26: delete "vehicle;" and insert --vehicle, and--

Claim 7, Column 16, Line 27: delete "wherein the detected condition is"

Claim 9, Column 16, Lines 33-35: delete Claim 9 and renumber Claims 10-16 to 9-15

Claim 13, Column 16, Line 48: delete "whether a detected" and insert --whether the detected--

Claim 14, Column 16, Line 50: delete "claim 13" and insert --claim 7--

Claim 14, Column 16, Lines 50-51: delete "condition is a current" and insert --condition further includes a current--